(12) United States Patent
Schwarz

(10) Patent No.: US 9,937,633 B2
(45) Date of Patent: Apr. 10, 2018

(54) PUNCH FOR PUNCHING POLYMERIC MOTOR VEHICLE COMPONENTS

(71) Applicant: REHAU AG + CO, Rehau (DE)

(72) Inventor: Ralph Schwarz, Gunzenhausen (DE)

(73) Assignee: REHAU AG + CO., Rehau (DE)

( * ) Notice: Subject to any disclaimer, the term of this patent is extended or adjusted under 35 U.S.C. 154(b) by 224 days.

(21) Appl. No.: 14/784,169

(22) PCT Filed: Apr. 11, 2014

(86) PCT No.: PCT/EP2014/000977
§ 371 (c)(1),
(2) Date: Oct. 13, 2015

(87) PCT Pub. No.: WO2014/169999
PCT Pub. Date: Oct. 23, 2014

(65) Prior Publication Data
US 2016/0052157 A1    Feb. 25, 2016

(30) Foreign Application Priority Data

Apr. 15, 2013   (DE) .................... 20 2013 101 583 U

(51) Int. Cl.
*B26D 7/27*     (2006.01)
*B26F 1/14*     (2006.01)
(Continued)

(52) U.S. Cl.
CPC ............... *B26D 7/27* (2013.01); *B25J 11/005* (2013.01); *B25J 15/0066* (2013.01); *B26D 5/06* (2013.01);
(Continued)

(58) Field of Classification Search
CPC ... B25J 11/005; B25J 15/0066; B26D 7/2614; B26D 7/27; B26F 1/14; B26F 1/38
See application file for complete search history.

(56) References Cited

U.S. PATENT DOCUMENTS 6,073,525 A * 6/2000 Edwards .................. B21J 15/28
29/465
6,240,332 B1 * 5/2001 Buttrick ................. G05B 19/04
700/169

FOREIGN PATENT DOCUMENTS

DE    102004004194    8/2005
DE    102004018309    11/2005
(Continued)

OTHER PUBLICATIONS

English Abstract of DE102009019644.
(Continued)

*Primary Examiner* — Mark A Osele
*Assistant Examiner* — Christopher C Caillouet
(74) *Attorney, Agent, or Firm* — Preston Smirman; Smirman IP Law, PLLC

(57) ABSTRACT

The invention relates to a punch for punching polymeric motor vehicle components, in particular bumpers, comprising a machine frame (1), at least one device for fixing a polymeric motor vehicle component (2) on the machine frame (1), and at least one punch device (3), wherein the punch device (3) comprises at least one punching tool (4) and at least one punching die (5). According to the invention, the punching tool (4) and/or the punching die (5) is/are fastened to a receiving device (6) of a movable carrier (7, 8), wherein the carrier (7, 8) has at least one further receiving device (6) for fastening at least one further processing apparatus (9, 10, 20, 30), such that the punch can be set to a new, different processing step involving the further processing apparatus (9, 10, 20, 30) by a movement of the carrier (7, 8).

7 Claims, 2 Drawing Sheets

Figure 1:
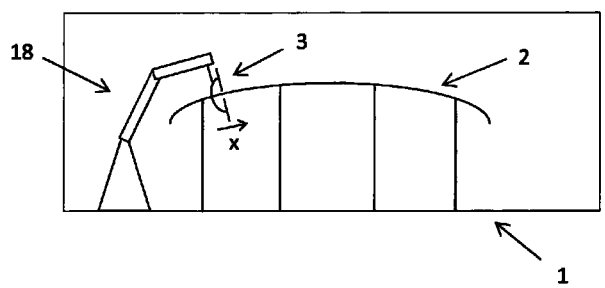

(51) Int. Cl.
      *B25J 11/00*     (2006.01)
      *B26F 1/02*      (2006.01)
      *B26F 1/38*      (2006.01)
      *B26D 5/06*     (2006.01)
      *B26D 7/26*     (2006.01)
      *B25J 15/00*    (2006.01)
      *B26D 7/01*     (2006.01)

(52) U.S. Cl.
    CPC .............. *B26D 7/2614* (2013.01); *B26F 1/02* (2013.01); *B26F 1/14* (2013.01); *B26F 1/38* (2013.01); *B26D 7/01* (2013.01)

(56) References Cited

FOREIGN PATENT DOCUMENTS

| | | |
|---|---|---|
| DE | 102005060026 | 6/2007 |
| DE | 102009019644 | 11/2010 |
| FR | 2962929 | 1/2012 |

OTHER PUBLICATIONS

English Abstract of DE102005060026.
English Abstract of FR2962929.
English Abstract of DE102004004194.
English Abstract of DE102004018309.
International Search Report.
Translation of the International Search Report.
Written Opinion of the International Searching Authority.
Translation of the Written Opinion of the International Searching Authority.

\* cited by examiner

PUNCH FOR PUNCHING POLYMERIC MOTOR VEHICLE COMPONENTS

CROSS-REFERENCE TO RELATED APPLICATION

The instant application is a national phase of PCT International Application No. PCT/EP2014/000977, filed Apr. 11, 2014, and claims priority to German Patent Application Serial No. 202013101583.0, filed Apr. 15, 2013, the entire specifications of both of which are expressly incorporated herein by reference.

The invention relates to a punching machine for punching of polymeric automotive components, in particular bumpers, with
- a machine frame,
- at least one device for fixing a polymeric vehicle component on the machine frame and
- at least one punching device, wherein the punching device comprises at least one punching tool and at least one punching die. Such punching machines are known in the art. They are used, for example, to provide recesses in the bumpers during the production of automotive bumpers, which are required for the inclusion of parking sensors, headlamp cleaning arrangements, spacers and the like.

According to the prior art, the structural design of the punching machine is precisely tailored to the particular polymeric vehicle component. The production of a differently designed device is not possible by means of such a machine without a costly conversion. This has, for example, as consequence that such a punching machine is retained further solely for spare parts as required for expired motor vehicle series, resulting in corresponding space requirement and reservation of machine capacity.

Against the described background, the present invention has as object to provide a punching machine with the characteristics described initially, which can be used flexibly and in particular can be adapted with little effort in the processing of a modified component geometry.

According to the invention the object is achieved in that the punching tool and/or the punching die is/are fixed to a receiving device of a movable carrier whereby the carrier has at least one further receiving device for fastening at least one further processing device, so that by way of a movement of the carrier a setting of the punching machine to a new, different design processing step by way of the further processing device can be undertaken. The invention is based on the realization that by the installation of punching tool and punching die on a mobile carrier, it can be adjusted by a simple movement of the punching machine to a different configuration processing. The conventional change to the equipment of processing facilities by means of, for example, loosening bolts, readjustment and re-locking, is obsolete. On the carrier also several processing devices may be provided in addition to the punching tool and the punching die, in particular, for example, two, three or even more processing devices can be provided. By means of a corresponding movement of the carrier, it is thus possible to bring each of the carrier-mounted machining facilities into working position, without requiring an elaborate reconversion procedure. Thus, in a carrier having four different processing steps four different processing steps can be carried out by a suitable movement of the carrier in succession. Here several different punching operations for providing several supply different recesses in the polymeric vehicle component, or even different machining operations, for example, a combination of punches with welding and/or adhesive may be involved.

The carrier is expediently designed to be rotationally movable, so that by a rotary movement of the carrier, the further processing device can be brought into a working position. In the context of the invention it is here in particular provided that the rotational axis of the carrier is alligned to be at least substantially perpendicular, preferably perpendicular, to the machine direction of the punching device. By way of a simple rotational movement of the carrier, it is thus possible to bring the various processing devices in processing position. In this connection it is particularly expedient that the carrier is star-shaped. The rotational movement is normally carried out by an electric drive, for example a servo motor. In addition to the punching tool and the punching die at least one further processing device may be provided which can be positioned in the same angular position of the carrier in a processing position.

Both the punching tool and the punching die are each suitably attached to a moving carrier. By means of a corresponding movement of both carriers thus the two mating processing devices, such as another punching tool and a further punching die or a holding-down device or a welding tool and a holding-down device or an adhesive-application device and a holding-down device, are brought into working position.

Within the scope of the invention is that the carrier is arranged on a C-shaped bracket, on which the entire punching device is mounted. In particular, for small quantities, it is advantageous that the bracket is mounted on a robot. In this case, by a corresponding displacement movement of the robot along the automotive component to be machined, combined with the previously described movement of the carrier, several processing steps can be sequentially performed in that several sequential punching operations or also combinations of punching and/or welding and/or adhesive operations may apply.

Alternatively thereto it is also possible that the bracket is fixedly arranged and the adjustment of the exact working position, is adjustable by means of at least one electric motor, preferably a servomotor. This embodiment is particularly useful for larger quantities. In this case we speak of a so-called component guided process, in which the component is guided past the punching device. This must then be set exactly on the exact processing position for the respective machining step by way of the servomotor.

As previously described, the further processing device, may include at least one welding tool and/or at least one adhesive application device and/or at least one further punching tool. Overall, thereby a very large flexibility with regard to the processing of the polymeric automotive components is guaranteed.

A particularly considerable advantage of the inventive teaching results in the processing of different automotive component geometries. Thus, for example, the punching machine can be set by a movement of the carrier or carriers for processing another automotive component. In the context of the invention it also applies in particular also that the carrier, tuned to a particular vehicle component, is detachably connected to the punching machine and is exchangeable with at least one carrier tuned to a differently designed vehicle component. When changing the shape of the automotive component to be machined, for example, when changing a bumper of a specific production model to a bumper machining of another production model, therefore, only the carrier is exchanged against the exchange carrier, and thus the punching machine is already essentially functionally ready for processing the new automotive component. It therefore is not necessary to hold up an entire punching machine for a single component geometry, but ultimately several, diverse component geometries can be made ready by way of a simple exchange of the carrier.

The teaching of the invention is particularly useful for punching processes of polymeric automotive bumpers, but is in principle also suitable for all other types of polymeric automotive components, where stamping processes must be performed.

Figure 2:
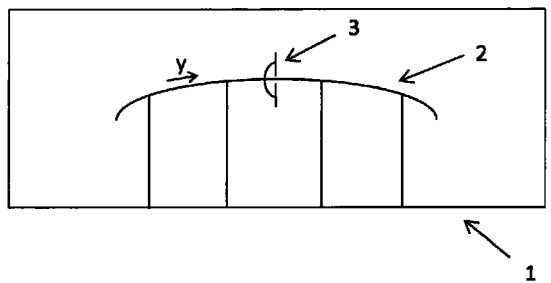
Figure 4:
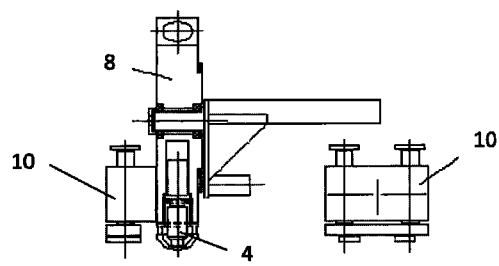
Figure 3:
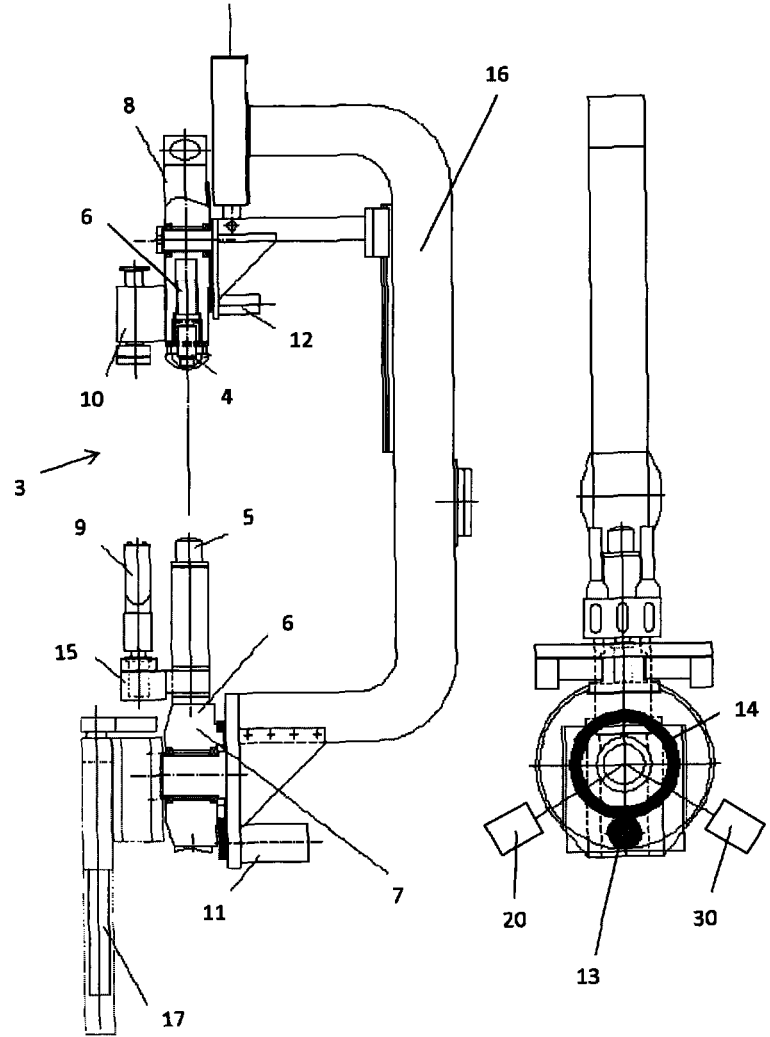

Hereafter the invention is explained in detail, reference being made to only one embodiment drawing. It is shown schematically:

FIG. 1 is a punching machine according to the invention in a greatly simplified representation, FIG. 2 is an alternative embodiment of the invention in an illustration analogous to FIG. 1, FIG. 3 is a punching apparatus according to the invention in a detailed view, and FIG. 4 is a partial view of the device shown in FIG. 3.

FIGS. 1 and 2 respectively show a punching machine for punching of polymeric automotive bumpers. The punching machines show a schematically illustrated machine frame 1 as well as means for fixing the vehicle bumper 2 on the machine frame 1 not shown in further detail. From the figures it is further evident that a punching device 3 is provided, wherein the punching device 3 includes a punching tool 4 and a punching die 5 (see detailed illustration in FIGS. 3 and 4).

From FIG. 3 it can be seen that the punching tool 4 and the punching die 5, respectively are attached in a holding device 6 of a movable carrier 7, 8, wherein the carriers 7, 8 respectively include more additional holding devices 6 for attachment of further machining processing devices 9, 10. In addition to the processing devices 3, 4, 9, 10 are also processing devices 20, 30 are provided offset at an angle of $\alpha=120°$ (see. FIG. 3 right-hand illustration) on the support axes a, b. In particular, by means of a comparative study of the left and right-hand illustration in FIG. 3 it can be seen that the carriers 7, 8 are formed rotational and are each aligned perpendicular to the machining direction of the punching device 3. Thus, by a simple rotational movement of the carriers 7, 8 different processing devices 3, 4, 9, 10, 20, 30 are brought into working position. This rotational movement is in each case carried out by a servo motor 11, 12, which has a drive wheel 13, which cooperates with an output gear 4 of the carriers 7, 8. The carriers 7, 8 each have a star-shaped geometry. FIGS. 3 and 4 show, in addition to the machining devices punching tool 4 and a punching die 3, other processing devices, namely welding electrodes 9 for performing welding operations, which are mounted in a suitable exchange receptacle 15, as well as a hold-down device 10 with holder support pillows, which are required for welding and adhesive procedures for fixing the bumper 2. In the right hand illustration of FIG. 3, only the lower carrier 7 is shown in a front view and in section. From the figures it can be seen that the carriers 7, 8 are arranged on a C-shaped bracket 16 to which the whole punching device 3 is mounted. In FIG. 3, a feed unit 17 is also shown for the welding electrodes 9. The FIG. 4 shows the upper carrier 8 in a single representation, whereby the right-hand device is again shown separately in a side view.

In the production in the working position according to FIG. 3, initially a stamping operation with the punching device 3 and the punching die 4 is performed. Thereafter the C-frame 16 is moved to a certain extent in the plane to the right, so that now the welding electrodes 9 and the hold-down device 10 appropriately are positioned for a subsequent welding operation at the same location of the bumper 2. By means of the feed unit 17 the welding electrodes 9 are lifted out of the exchange receptacle 15 and delivered for the welding process against the same position of the bumper 2. Consequently, at the angular position of carriers 7, 8 shown in FIG. 3, 8 adjacent to the punching device 3 and the punching die 4 in addition to other processing devices 9, 10 are brought into a machining position. After this combined punching and welding procedure the C-frame 16 is moved to the next processing location of the bumper, and by way of a simple rotation of the carriers 7, 8 other machining tools 20, 30 can be brought into a processing position. Alternatively hereto, the C-frame 16 can also be fixed and the bumper 2 can be moved for the individual processing steps. These two methods are explained in detail in the following section in connection with FIGS. 1 and 2.

In the embodiment shown in FIG. 1 the C-shaped bracket 16 is mounted on a robot 18. In this case, by a movement of the robot 18 the C-frame 16 is moved along the vehicle bumper 2 and the carriers 7, 8 are rotated such that after each processing step matching processing devices are respectively brought into the respectively fitting working position. The movement of the C-bracket 16 is indicated by the arrow x direction. In this way 2 processing steps are performed in sequence according to different positions of the bumper. This may involve, for example, several consecutive punching operations, but also in particular to combinations of punching operations with welding and/or adhesive procedures. By means of the inventive teaching, it is therefore also possible in particular, initially at a particular machining position of the bumper 2 to perform the punching process and thereafter at the same location a welding or an adhesive step. In this way, for example, initially a breakthrough for a parking sensor and then the corresponding sensor holder are directly welded to the bumper 2.

In the variation shown in FIG. 2 the C-frame 16 is fixedly arranged and the bumper 2 is led by the implementation of processing steps at different positions of the bumper 2 at the C-frame 16. The movement of the bumper 2 is indicated by the direction of the arrow y. In FIG. 2, the stationary C-frame 16 hereby must be aligned exactly only for the respective processing step, which takes place via one or more servo motors, not shown in detail.

Within the framework of the invention it applies in particular that the carriers 7, 8 shown in the figures may be replaced by (not shown) exchange carriers, in order to convert the punching machine for machining a differently designed vehicle bumper. This conversion requires comparatively little effort, since only the conversion of the carriers 7, 8 must be carried out and if required only further minor adjustments need to be made. The subject of the invention is thus also a system consisting of the punching machine with the two carriers 7, 8 including processing devices 3, 4, 9, 10, which are suitable for processing a bumper model A, and at least a pair of exchange carriers with processing facilities, which are suitable for processing a bumper model B. Through an exchange of carriers 7, 8 against the exchange carriers retrofitting the punching machine from model A to model B can be carried out.

The invention claimed is:

1. A punching machine for punching polymeric vehicle components, comprising:
   a machine frame;
   at least one device for fixing a polymeric vehicle component on the machine frame; and at least one punching device;
wherein the punching device includes at least one punching tool and at least one punching die;
wherein the punching tool is attached on a first holding device of a first rotationally movable carrier;
wherein the punching die is attached on a second holding device of a second rotationally movable carrier;
wherein each of the first and second rotationally movable carriers includes a second holding device for fastening a processing device, so that by a movement of each of the first and second rotationally movable carriers, an adjustment of the punching machine to a new or different design processing step with the processing device can be performed;
wherein each of the first and second rotationally movable carriers are arranged on a C-shaped bracket, on which the entire punching device is mounted.

2. The punching machine according to claim 1, wherein a rotational axis of each of the first and second rotationally movable carriers is substantially oriented perpendicular to a machining direction of the punching device.

3. The punching machine according to claim 2, wherein the processing device can be oriented at the same angular position of each of the first and second rotationally movable carriers when brought into the processing position.

4. The punching machine according to claim 1, wherein the bracket is mounted on a robot.

5. The punching machine according to claim 1, wherein the bracket is adjustable by means of at least one electric motor, wherein the motor includes a servomotor.

6. The punching machine according to claim 1, wherein the processing device includes any one of at least one welding tool, at least one adhesive application device, or at least one die.

7. The punching machine according to claim 1, wherein each of the first and second rotationally movable carriers is tuned to a first motor vehicle component and is detachably connected to the punching machine, wherein a second motor vehicle component is tuned to an exchange carrier, against which each of the first and second rotationally movable carriers is interchangeable.

* * * * *